United States Patent
Sone et al.

[11] Patent Number: 6,135,891
[45] Date of Patent: Oct. 24, 2000

[54] CONSTANT VELOCITY UNIVERSAL JOINT

[75] Inventors: Keisuke Sone; Shogo Okada, both of Hamamatsu; Akira Wakita, Iwata; Kazuhiko Yoshida, Hukurol, all of Japan

[73] Assignee: NTN Corporation, Osaka-fu, Japan

[21] Appl. No.: 09/151,769

[22] Filed: Sep. 11, 1998

[30] Foreign Application Priority Data

Sep. 29, 1997 [JP] Japan .................................. 9-263915

[51] Int. Cl.$^7$ .................................................. F16D 3/22
[52] U.S. Cl. .......................................... 464/145; 464/906
[58] Field of Search .................................. 464/139, 140, 464/141, 142, 145, 159, 171; 403/74, 57

[56] References Cited

U.S. PATENT DOCUMENTS

| | | | |
|---|---|---|---|
| 1,985,278 | 12/1934 | Bradley | 464/145 |
| 2,319,100 | 5/1943 | Anderson | 464/145 |
| 3,879,960 | 4/1975 | Welschof et al. | 464/145 |
| 3,982,840 | 9/1976 | Grosseau | 403/57 |
| 5,509,856 | 4/1996 | Welschof | 464/906 |
| 5,782,696 | 7/1998 | Guimbretiere | 464/145 |

*Primary Examiner*—Lynne H. Browne
*Assistant Examiner*—Kenneth Thompson
*Attorney, Agent, or Firm*—Arent Fox Kintner Plotkin & Kahn, PLLC

[57] ABSTRACT

A constant velocity universal joint is disclosed in which the end of a track groove 24 which opens to the open end surface 26 of the outer joint member 2 is formed with a cut portion 28$a$, 28$b$ for the incorporation of a ball, thereby making the incorporation of balls possible without shifting the position of the open end surface 26. Therefore, the strength of the inlet portion of the outer joint member 2 is increased. Furthermore, since the ball incorporating angle α of the cage 5 can be decreased, it is possible to increase the width of the pocket column portion 58 of the cage 5 and increase the strength of the cage 5.

10 Claims, 12 Drawing Sheets

CONSTANT VELOCITY UNIVERSAL JOINT

BACKGROUND OF THE INVENTION

1. Field of the Invention

This invention relates to a constant velocity universal joint used in the power transmission systems of automobiles and various industrial machines and adapted for smooth transmission of torque regardless of whatever angles (operating angles) the rotary shafts on the driving and driven sides may take. Particularly, it relates to a constant velocity universal joint of the type which does not make an axial slide (plunging) or the so-called fixed type, and more particularly, it relates to improvements in the end shape of a track groove which opens to the larger end surface of an outer joint member.

2. Description of the Prior Art

Figure 6A:
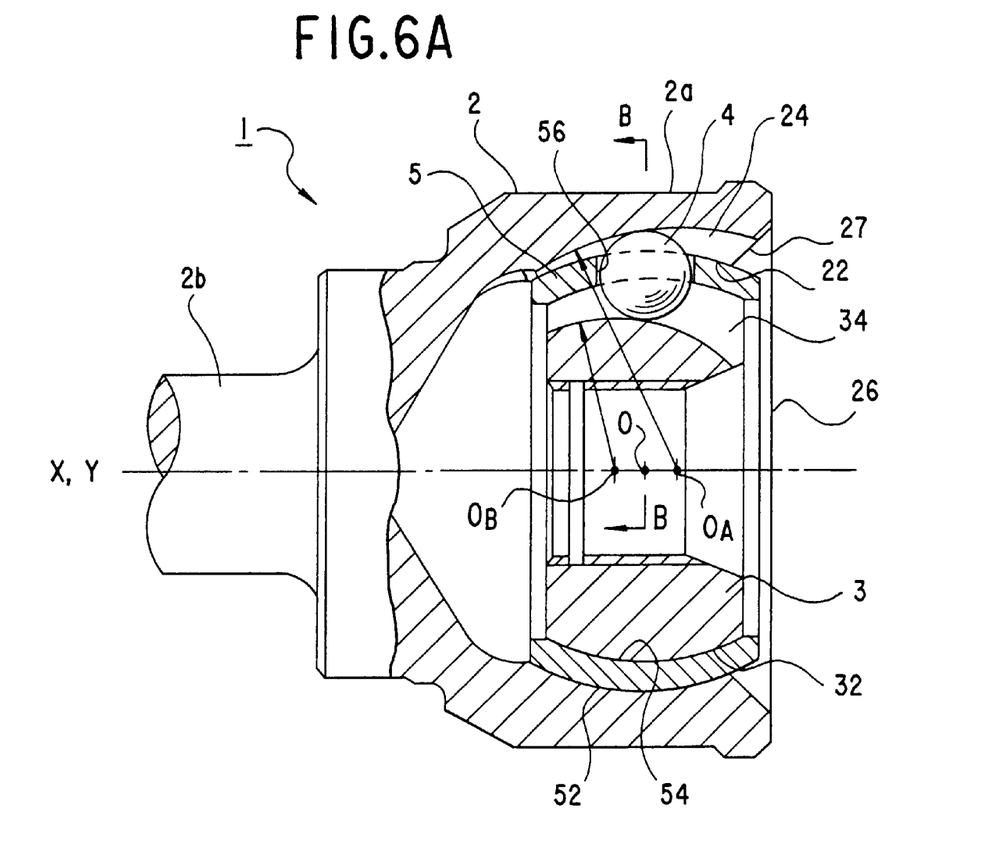
FIG. 6A is a longitudinal section of a constant velocity universal joint.
Figure 6B:
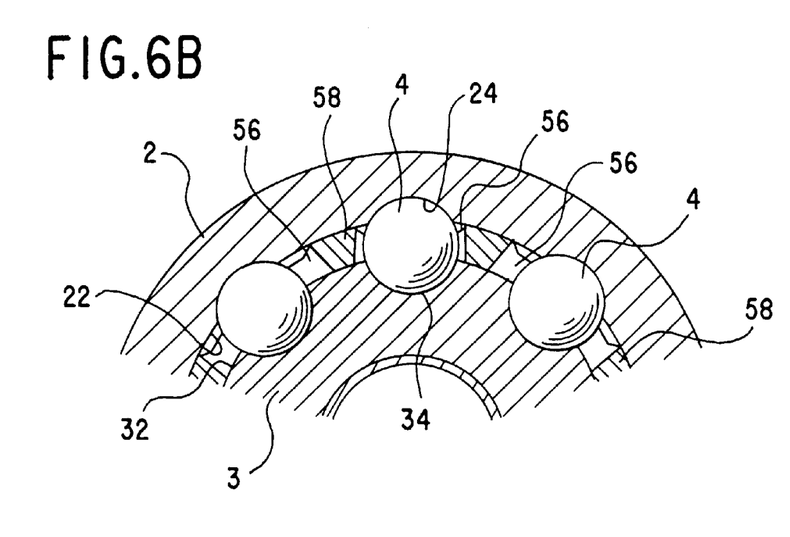
FIG. 6B is a section taken along line B—B in FIG. 6A.
Figure 8:
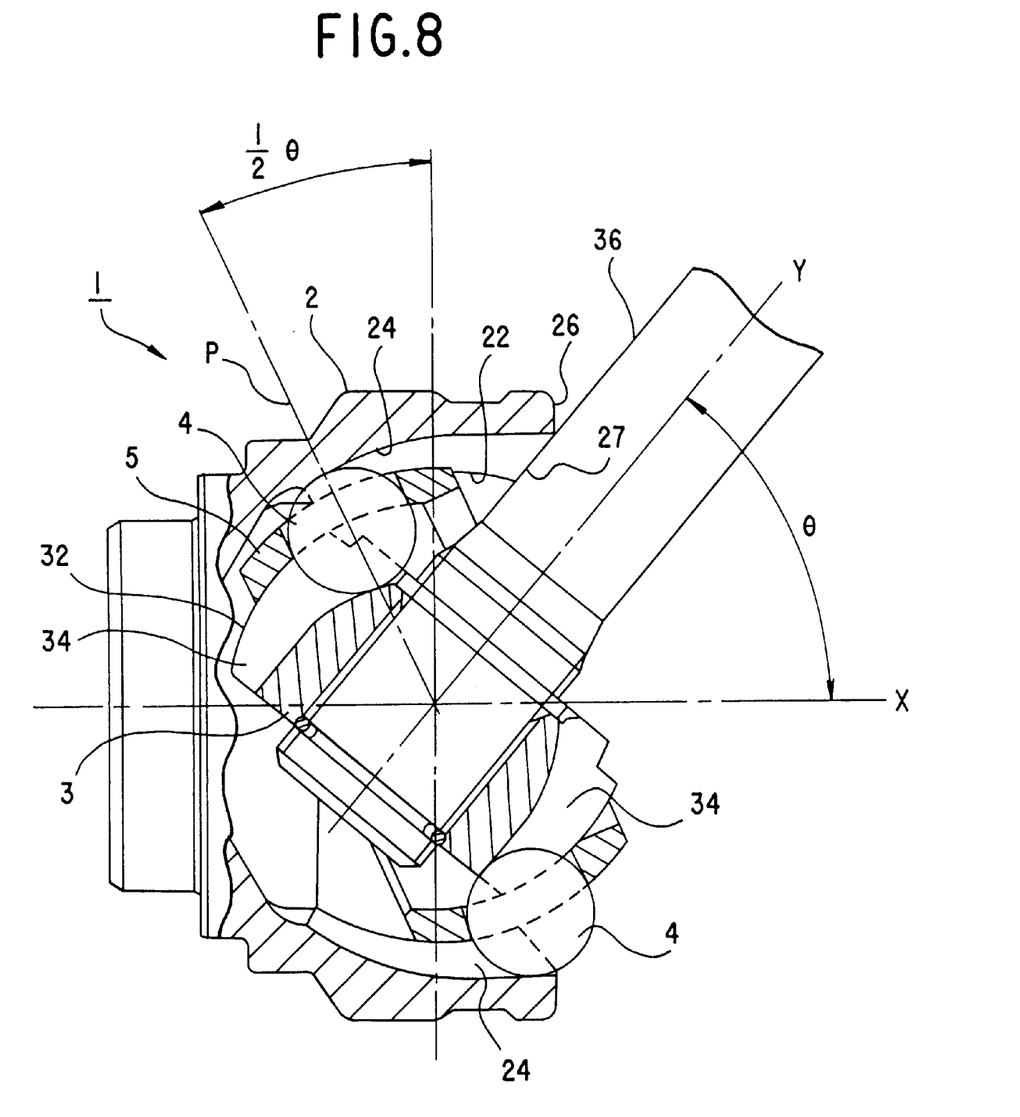
FIG. 8 is a longitudinal section of a constant velocity universal joint when the latter takes a maximum operating angle.

As shown in FIGS. 6A, 6B and 8, a fixed type constant velocity universal joint 1 comprises an outer joint member 2 having tack grooves 24 formed in the spherical inner surface 22 thereof, an inner joint member 3 having track grooves 34 formed in the spherical outer surface 32 thereof, balls 4 incorporated between the respective pairs of track grooves 24 and 34 of the outer and inner joint members 2 and 3, and a cage 5 incorporated between the outer and inner joint members 2 and 3 and formed with pockets 56 for receiving the balls 4.

Figure 9:
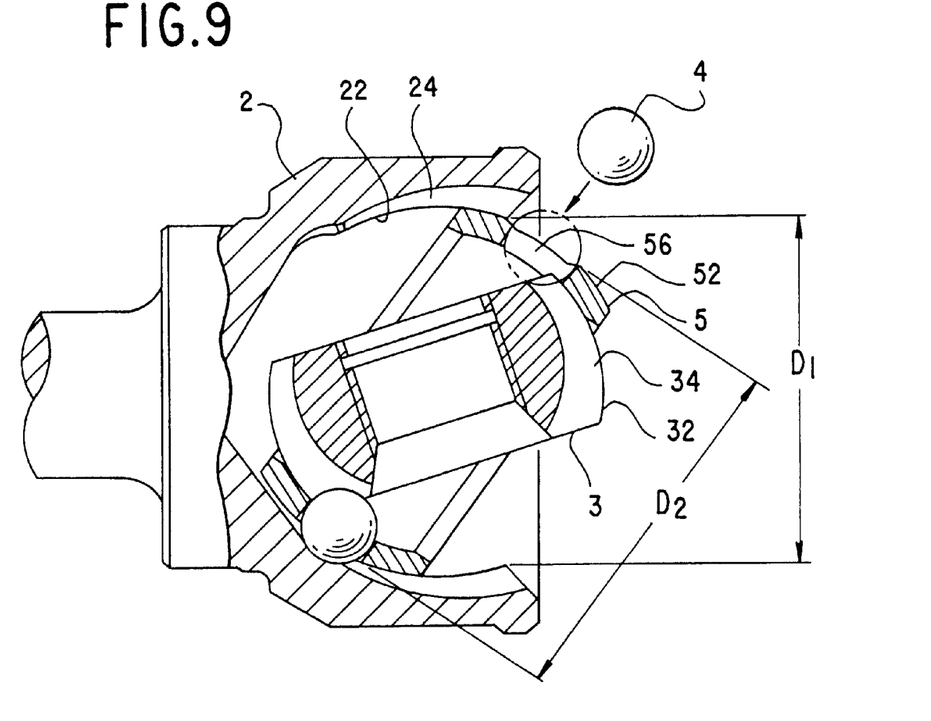
FIG. 9 is a longitudinal section showing the process for incorporating balls.
Figure 10:
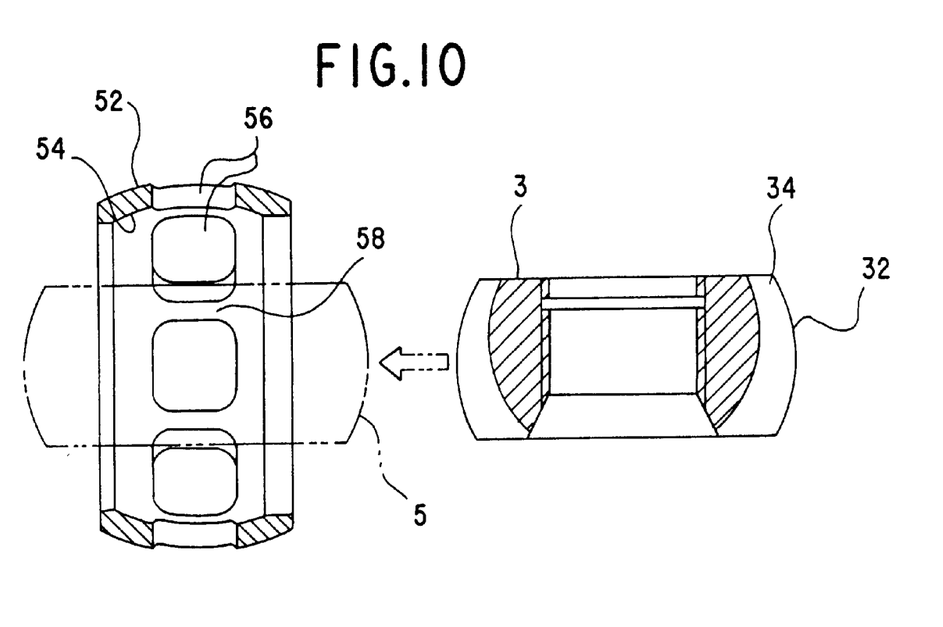
FIG. 10 is a longitudinal section showing the process for incorporating an inner joint member and a cage.
Figure 11:
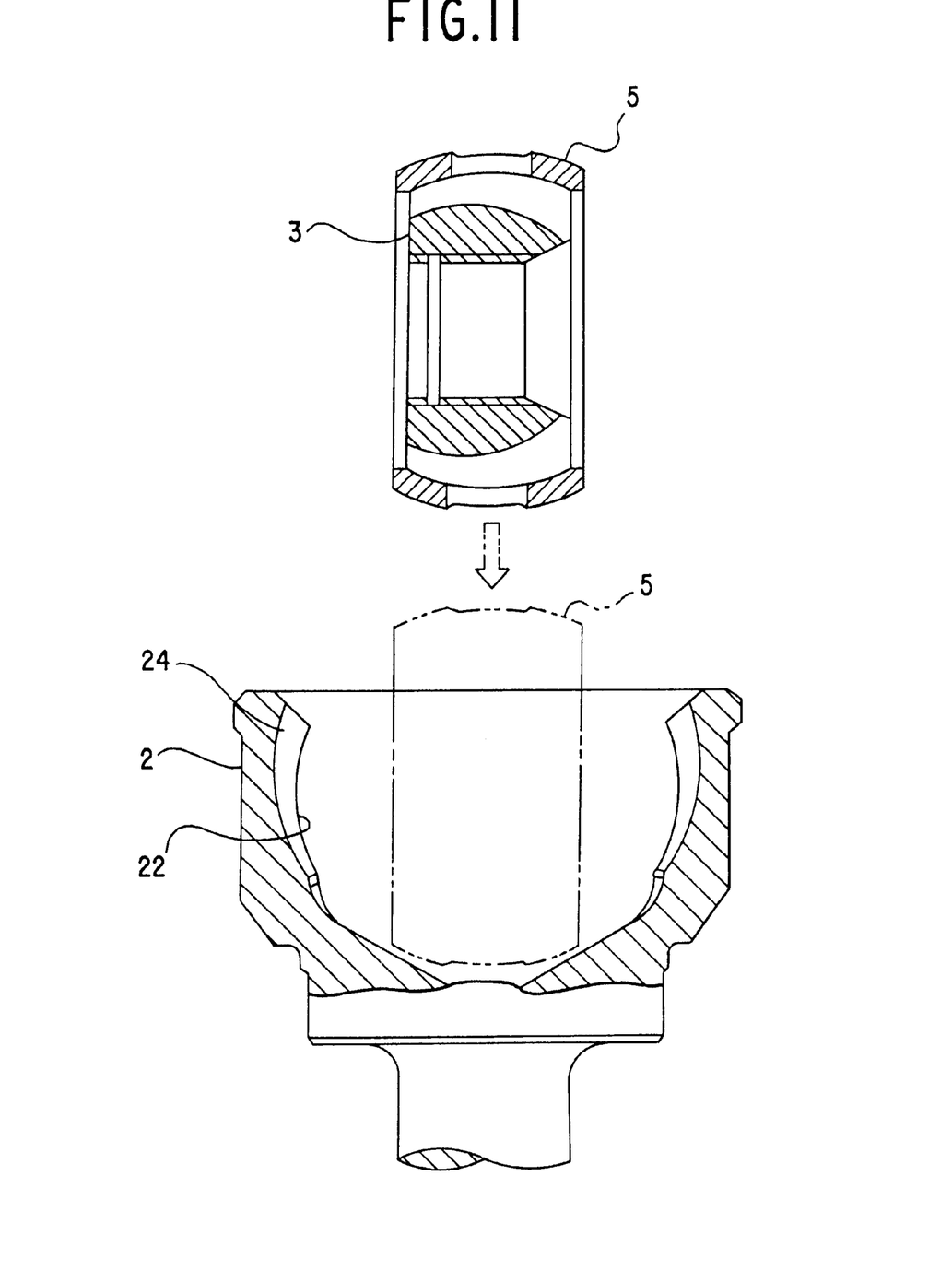
FIG. 11 is a longitudinal section showing the process for incorporating a cage-equipped inner joint member in an outer joint member.

In the fixed type constant velocity universal joint 1, as shown in FIG. 9, the inner diameter D1 at the open end of the outer joint member 2 is smaller than the outer diameter D2 of the cage 5; therefore, it is necessary that after the inner joint member 3 and the cage 5 have been incorporated in the outer joint member 2, the inner joint member 3 and the cage 5 be inclined to expose one of the pockets 56 of the cage 5 to the outside through the open end of the outer joint member 2, and then a ball 4 be incorporated into the pocket 56. The incorporation of the inner joint member 3 and cage 5 in the outer joint member 2 is effected, as shown in FIG. 10, by inclining the inner joint member 3 and cage 5 through 90°, inserting the inner joint member 3 in the cage 5, relatively turning the two parts through 90° in the direction in which the cage 5 and inner joint member 3 are coaxial with each other, and incorporating the inner joint member 3 in the cage 5. Then, as shown in FIG. 11, the cage-equipped inner joint member 3 and the outer joint member 2 are relatively inclined through 90°, the cage-equipped inner joint member 3 is inserted in the outer joint member 2, the two parts are inclined through 90° in the direction in which the outer and inner joint members 2 and 3 are coaxial with each other, and the cage-equipped inner joint member 3 is incorporated in the outer joint member 2.

In the fixed type constant velocity universal joint 1, when torque is transmitted between the outer and inner joint members 2 and 3 at an operation angle θ (FIGS. 7 and 8), the balls 4 move circumferentially of the cage 5 within the pockets 56. The amount of movement of the balls 4 increases in proportion to the operating angle θ. The angle of inclination of the cage 5 with respect to the outer joint member 2 is at a maximum when the balls 4 are incorporated as shown in FIG. 9 (this angle being referred to as the ball incorporating angle), and it is necessary to determine the peripheral length of the pockets 56 on the basis of the amount of movement of the balls 4 obtained at this time. Therefore, there is a relation such that as the ball incorporating angle increases, the width (circumferential dimension) of a column portion 58 between adjacent pockets 56 decreases and so do the areas of the inner and outer spherical surfaces 52 and 54 of the cage 5.

When constant velocity universal joints used in automobiles and the like are applied, e.g., to the driving shaft of front-wheel-drive cars, a slide type constant velocity universal joint is disposed on the differential-associated side and a fixed type constant velocity universal joint is disposed on the wheel-associated side and these two joints are connected by a shaft. Since the fixed type constant velocity universal joint operates in association with the movement of the steering wheel and makes the same movement as that of the ground-engaging wheel, it is necessary for the fixed type constant velocity universal joint to operates at a high operating angle. Since the fixed type constant velocity universal joint rotates and transmits torque at a high operating angle in this manner, it is required to have sufficient rigidity, strength and durability. For this reason, the outer rig 2, inner joint member 3, balls 4, and cage 5 of the fixed type constant velocity universal joint 1 are hardened before use by a heat treatment, such as carburizing or induction hardening. Usually, the component in the fixed type constant velocity universal joint 1 which is most vulnerable in an operation at a high operating angle is the cage 5. As the operating angle θ increases, the proportion of the portion of the cage 5 that overhangs the spherical inner surface 22 of the outer joint member 2 and the spherical outer surface 32 of the inner joint member 3 increases (FIGS. 7 and 8) and so does the axial force ion the balls 4. Therefore, the strength of the cage 5 sharply decreases when the operating angle takes a high value.

Further, in recent years, there has been a desire to improve milage of vehicles, the most prospective means to meet the desire being to reduce the weight of the vehicle, and it is also strongly desired to provide a light-weight compact version of the constant velocity universal joint. In making the fixed type constant velocity universal joint 1 lightweight and compact, it is essential to increase the strength of the cage 5, a component which is most vulnerable in an operation at a high operating angle, to the greatest extent. As measures therefor, it has been proposed to strengthen the material as by heat treatment. At any rate, however, there is a problem of cost increase. Increasing the thickness of the cage 5 would increase the strength; on the other hand, however, it is irrational in that it decreases the depths of the track grooves of the inner and outer joint members 3 and 2, which decrease, in turn, leads to a lowering of the allowable load torque and a considerable lowering of the durability. Further, the region of the cage 5 which is liable to break is the column portion 58 between adjacent pockets 56 which receive balls 4. Therefore, if the width of the column portion 58 is increased, the strength will increase. To this end, one may contemplate decreasing the ball diameter or increasing the PCD of the balls; however, both of the measures are undesirable in that the former lowers the durability of the joint and the latter increases the outer diameter of the joint.

Figure 12A:
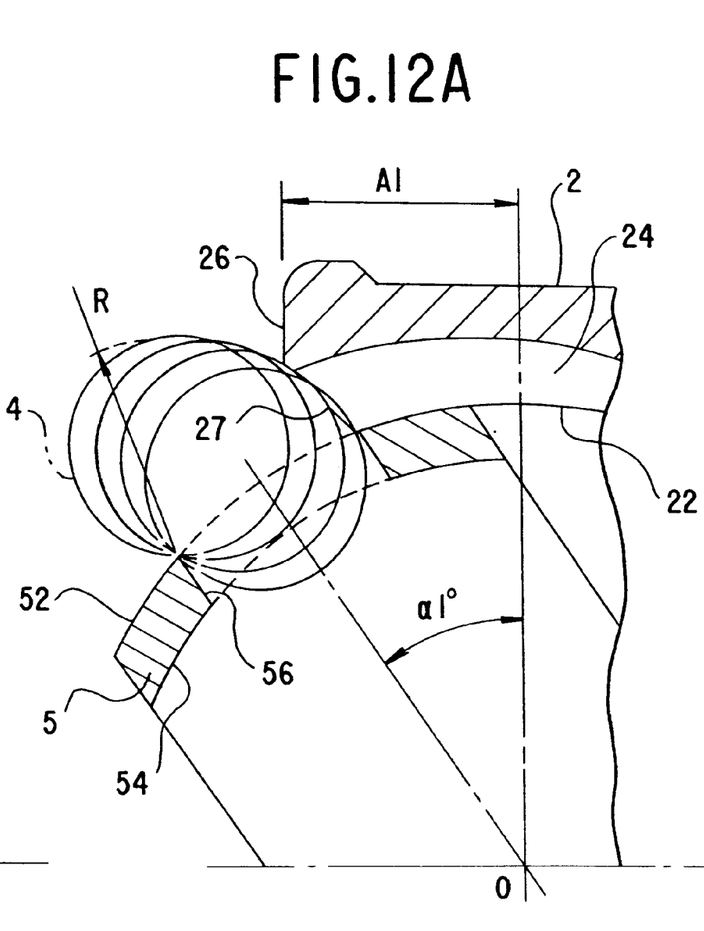
FIG. 12A is a longitudinal section in part of an outer joint member and a cage with a ball incorporating angle $\alpha_1$ therebetween.
Figure 12B:
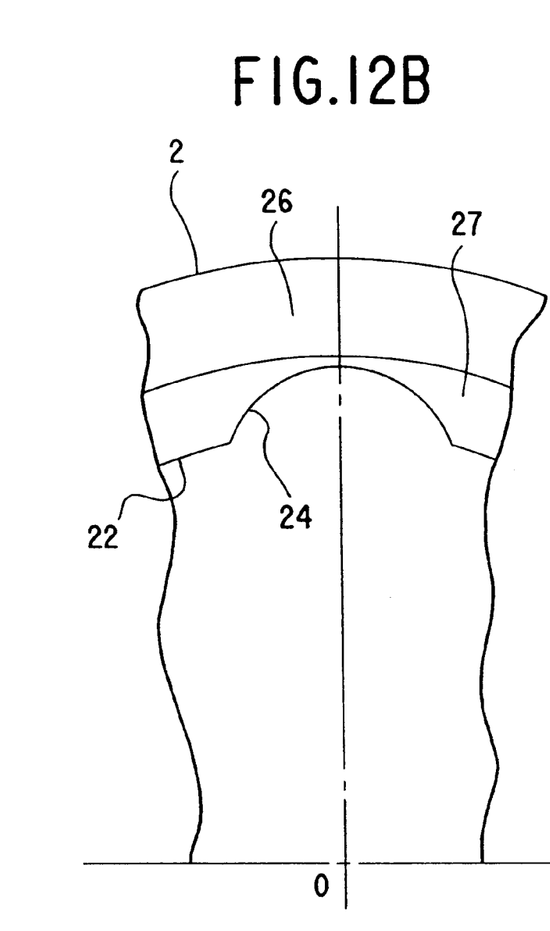
FIG. 12B is a front view in part of the open end surface of the outer joint member shown in FIG. 12A.
Figure 13A:
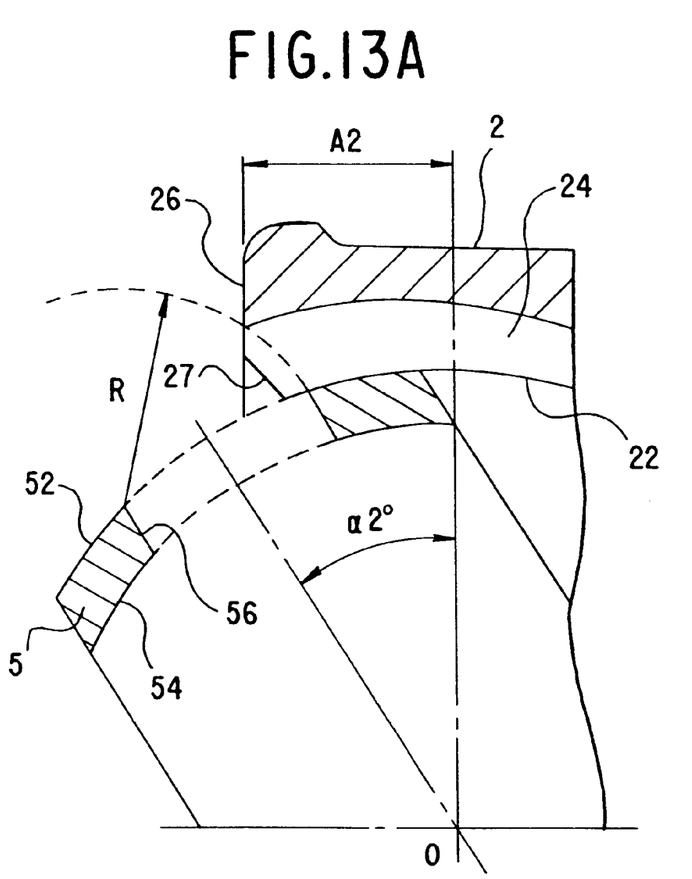
FIG. 13A is a longitudinal section in part of an outer joint member and a cage with a ball incorporating angle $\alpha_2$ therebetween.
Figure 13B:
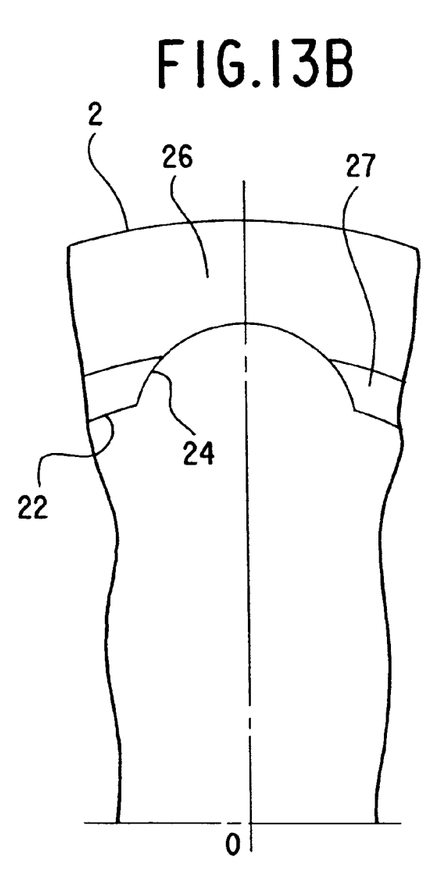
FIG. 13B is a front view in part of the open end surface of the outer joint member shown in FIG. 13A.

FIG. 12A and FIG. 12B show the inlet portion of the track groove 24 of the outer joint member 2 in a conventional fixed type constant velocity universal joint 1. The inlet portion of the track groove 24 is cut by a conical surface 27 determined by a shaft 36 when the latter takes a maximum operating angle θ (see FIGS. 7 and 8), and the position of the open end surface 26 is outside the conical surface 27 including the sectional plane of the cut end of the track groove. However, when compact formation is to be attained as by decreasing the PCD of balls 4, it is necessary, particularly where the number of balls is large (seven or more balls), to set the ball incorporating angle α for incorporating balls 4 at a smaller value than in the prior art because of the need to secure the width of the column portion 58 of the cage 5. However, if the ball incorporating angle α is decreased ($α_1 > α_2$), as shown in FIG. 13A and FIG. 13B, it becomes necessary to set the open end surface 26 at an intermediate position on the sectional plane of the cut end of the track groove of the conical surface 27. That is, the open end surface 26 of the outer joint member 2 is moved more backward than in the prior art ($A_1 > A_2$). This means that the arrangement having such outer joint member shape aiming at compact formation, as compared with the conventional arrangement, results in a lowering of the outer joint member strength associated with a high operating angle.

SUMMARY OF THE INVENTION

An object of this invention is to achieve the strengthening of the cage without incurring an increase in cost or a lowering of the required properties. Further, it is a technical object to realize the compact design and increase the high-operating-angle-associated strength of the outer joint member of a constant velocity universal joint particularly having a large number of balls.

A constant velocity universal joint according to this invention comprises an outer joint member having a spherical inner surface formed with a plurality of track grooves, an inner joint member having a spherical outer surface formed with a plurality of track grooves, balls disposed between the track grooves of the outer and inner joint members, and a cage disposed between the spherical inner and outer surfaces of the outer and inner joint members and having pockets for receiving the balls, wherein an end of each of the track grooves which opens to an open end surface of the outer joint member is formed with a cut portion for incorporating the ball. That is, according to this invention, an ingenious idea is applied to the end shape of the track groove which opens to the large end of the outer joint member, thereby making it possible to incorporate the balls without shifting the position of the open end surface of the outer joint member backward or rather while extending the position of the open end surface.

As for concrete shapes of the cut portion, an annular cut portion may be formed throughout the periphery of the outer joint member or a groove-shaped cut portion may be formed only in the bottom of the track groove. In the latter case, a cut portion may be formed only in those track grooves for which the ball incorporating angle of the cage are limited to a low value when balls are incorporated in the joint assembling process.

When a groove-shaped cut portion is to be formed only in the bottom of the track groove, it is desirable that the section shape thereof be circular or elliptic and that the axial sectional shape be straight or arcuate.

While the cut portion may be formed by cutting, if it is formed simultaneously with the forging of the outer joint member, this is economical and provides a high yield, or high percentage of effective use, of material.

As another form of the cut portion the axial sectional shape of the track grooves in the open end surface of the outer joint member may be expanded axially and toward the outer diameter from a point outside the allowable operating angle range of the joint.

In order to increase the sectional area of the column portion of the cage without lowering other characteristics, it is necessary to decrease the peripheral length of the pockets. This peripheral length depends on the demands in the assembly operation of the constant velocity universal joint. That is, in assembling the outer joint member, inner joint member, cage, and balls, a large operating angle (ball incorporating angle) is required when the last ball is incorporated, and a sufficient peripheral length is required to permit this. When a constant velocity universal joint takes an angle, the positions of the individual balls circumferentially advance or delay with respect to the pockets. The larger the ball incorporating angle, the larger the amount of circumferential movement of the balls. When the last ball is incorporated, the two adjoining balls on opposite sides of the last ball make the greatest movement circumferentially of the pocket, causing interference between the balls and the column portions of the pockets. Therefore, if the ball incorporating angle for incorporating the last ball can be decreased, the interference between the two adjoining balls and the column portions does not occur, so that the peripheral length of the pockets can be decreased, with the result that the sectional area of the column portion increases.

Usually, the ball incorporating angle is 10–30 degrees larger than the allowable operating angle of the joint. Therefore, because of the necessity for permitting the incorporation of balls, it has been necessary that the peripheral length of the pockets be greater than that which is required when the constant velocity universal joint is actually attached to an automobile and used. Conversely, if the ball incorporating angle can be decreased, the peripheral length of the pockets can be decreased and the sectional area of the column portion can be correspondingly increased. As a measure to decrease the ball incorporating angle, the inlet end surface of the track groove of the outer joint member interfering with the ball during ball incorporation is radially expanded. Since this causes the point on the ball for interference with the outer joint member to move inwardly from the open end surface, it is possible to decrease the ball incorporating angle to thereby decease the peripheral length of the pockets and to correspondingly increase the sectional area of the column portion. In the case where the inlet portion of the track groove is to be axially expanded in this manner, a point outside the allowable operating angle range of the joint shall be the starting point of expansion.

In addition, the present invention is applicable when the number of balls is 7 or above as well as when it is 6. The greater the number of balls, the more striking the result effect.

DESCRIPTION OF THE PREFERRED EMBODIMENTS

First, the basic arrangement will be described with reference to FIGS. 6A, 6B, 7 and 8. A constant velocity universal joint 1 comprises an outer joint member 2, an inner joint member 3, balls 4 and a cage 5.

The outer joint member 2 comprises a cup-shaped mouth portion 2a and an axle portion 2b to be connected to one of the shafts to be coupled together. The mount portion 2a has a spherical inner surface 22 formed with a plurality of circumferentially equispaced track grooves 24 extending axially of the outer joint member 2. The longitudinal sectional shape of the track groove 24 is an arc having a center of curvature OA on the axis X of the outer joint member 2. The outer end of the track groove 24 opens to the open end surface 26 of the mouth portion 2a.

The inner joint member 3 is spline-connected to the other of the two shafts to be coupled together, i.e., a shaft 36, and its spherical outer surface 32 is formed with the same number of track grooves 34 extending axially of the inner joint member 3 as that of the track grooves 24 of the outer joint member 2. The longitudinal sectional shape of the track groove 34 is an arc having a center of curvature OB on the axis Y of the inner joint member 3.

The track grooves 24 and 34 of the outer and inner joint members 2 and 3 are paired and a ball 4 is incorporated between the track grooves 24, 34 in each pair, whereby torque is transmitted between the inner and outer joint members. The cross sectional shape of the track grooves 24, 34 is a Gothic arch (see FIG. 4B), making angular contact with the ball 4.

Figure 7:
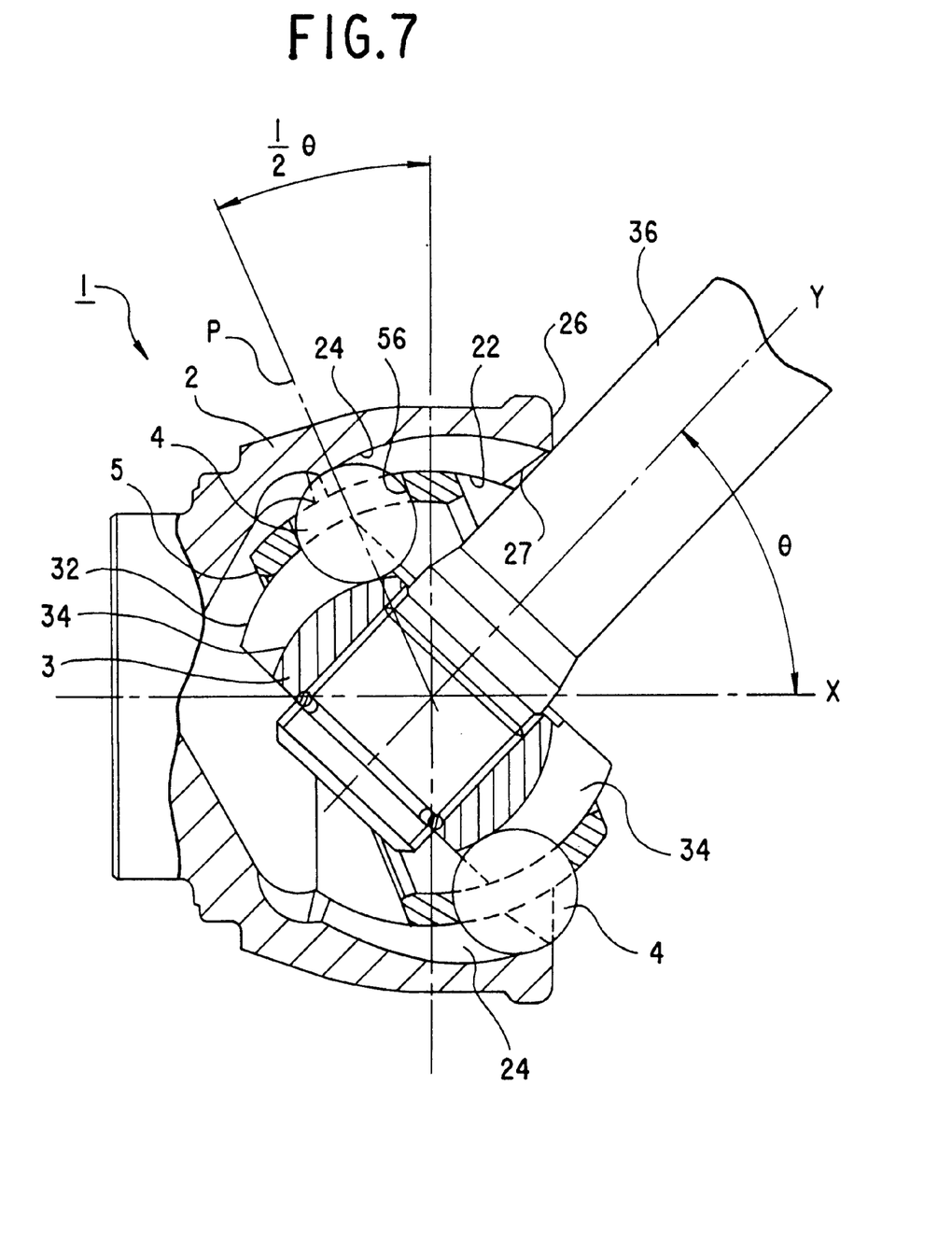
FIG. 7 is a longitudinal section of a constant velocity universal joint when the latter takes a maximum operating angle.

As shown in FIG. 6A, the centers of curvature OA and OB of the track grooves 24 and 34 of the outer and inner joint members 2 and 3 are offset to opposite sides of and equidistantly from the joint center O (which is the center of curvature for both the spherical inner and outer surfaces of the outer and inner joint members). Therefore, the ball track composed of the track grooves 24 and 34 in each pair has a wedge shape gradually expanding axially from one side to the other. When torque is transmitted with the fixed type constant velocity universal joint 1 taking an operating angle θ as shown in FIGS. 7 and 8, an axial force acts on the ball 4 to move the latter from narrower to wider region of the wedge-shaped ball track. This axial force causes the ball 4 to be positioned in a plane P which is perpendicular to the bisector of the operating angle θ, thereby securing the property of constant velocity between the two shafts connected by the fixed type constant velocity universal joint 1.

The cage 5 is interposed between the outer and inner joint members 2 and 3 and serves to perform the function of holding all balls 4 always in the plane P. The cage 5 comprises a spherical outer surface 52 in spherical contact with the spherical inner surface 22 of the outer joint member 2 and a spherical inner surface 54 in contact with the spherical outer surface 32 of the inner joint member 3, and pockets 56 are formed at circumferentially equispaced positions in the cage 5 for receiving balls 4. The axial dimension of the pocket 56 in the cage 5 is normally such as to apply a suitable degree of interference to the ball 4. The peripheral length of the pocket 56 is determined such that the ball 4 does not interfere with the pocket, in consideration of the amount of peripheral movement of the ball during incorporation of the ball, which incorporation is made possible, as already described in connection with FIG. 9, by relatively including the outer joint member 2 and cage 5 until the pocket 56 faces the outside at the open end of the outer joint member 2. What is in balanced relation to this peripheral length of the pocket 56 is the width of the column portion 58 between the adjoining pockets 56.

The arrangement described so far does not basically differ from that in the prior art.

FIGS. 1A through 1B through FIGS. 4A, 4B and 4C show embodiments of the present invention wherein without shifting the position of the open end surface 26 of the outer joint member 2 backward, the ball incorporating angle α of the cage 5 is decreased ($\alpha_1 > \alpha_2$) and the incorporation of the ball 4 is made possible.

Figure 1A:
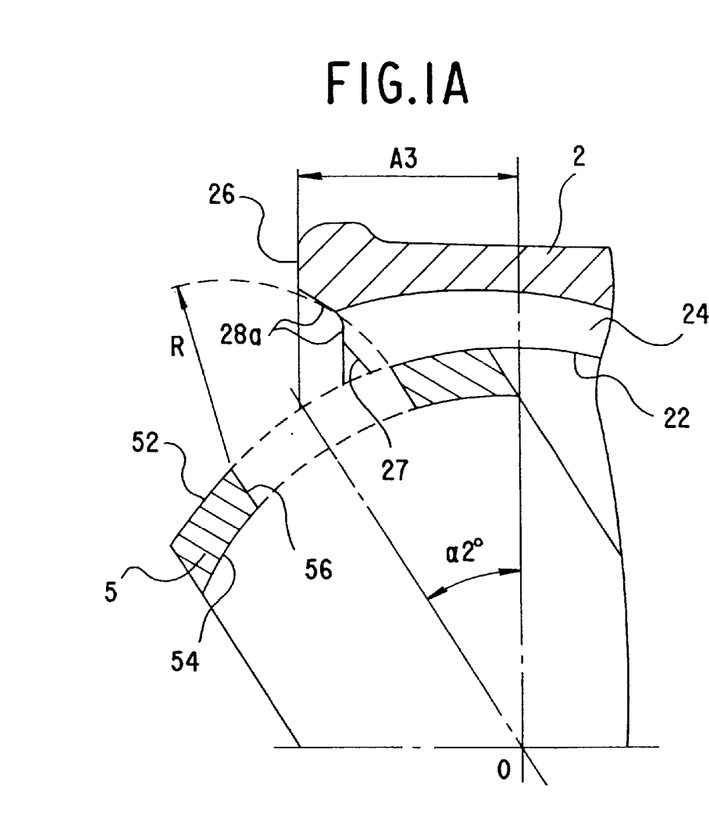
FIG. 1A is a longitudinal section in part of an outer joint member and a cage, showing an embodiment of the invention.
Figure 1B:
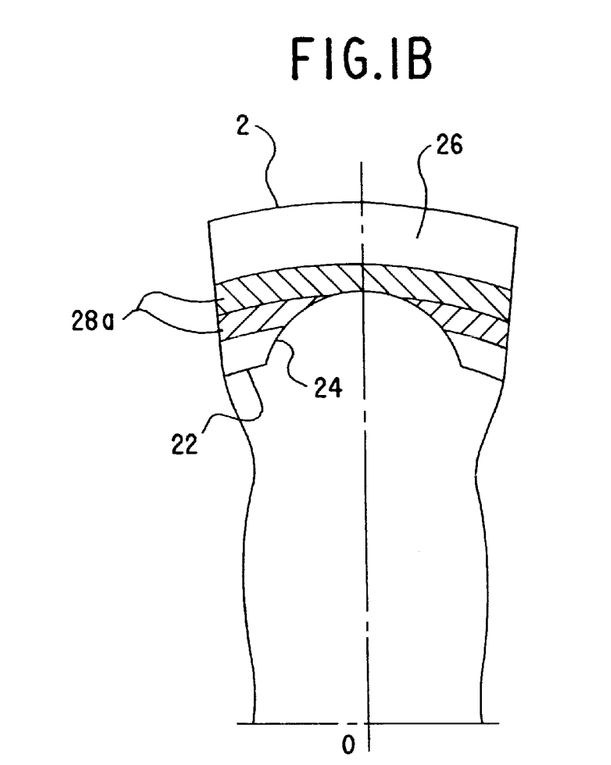
FIG. 1B is a front view in part of the outer joint member shown in FIG. 1A.

FIG. 1A and FIG. 1B show an arrangement wherein the position of the open end surface 26 of the outer joint member 2 is extended more than in the prior art (A1<A3) and an annular cut portion 28a shaded area in FIG. 1 A) is formed throughout the periphery of the outer joint member 2 to permit the incorporation of the ball 4. Since the ball incorporating angle α is smaller than in the prior art ($\alpha_1 > \alpha_2$), the width of the column portion 58 of the cage 5 can be correspondingly increased, thus adding to the strength of the cage 5. Further, since the open end surface 26 of the outer joint member 2 is extended more than in the prior art, the strength of the outer joint member 2 is increased particularly at a high operating angle. Although the cut portion 28a can be simultaneously formed in the process of forging the outer joint member 2, it can be formed at low cost if lathing is employed.

Figure 2A:
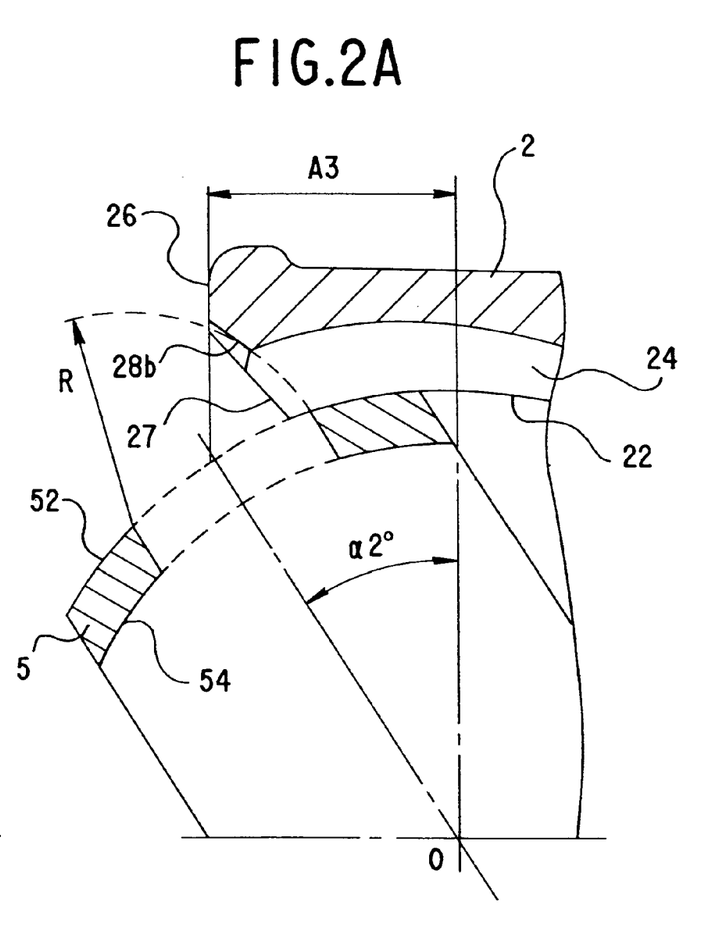
FIG. 2A is a longitudinal section similar to FIG. 1A, showing another embodiment.
Figure 2B:
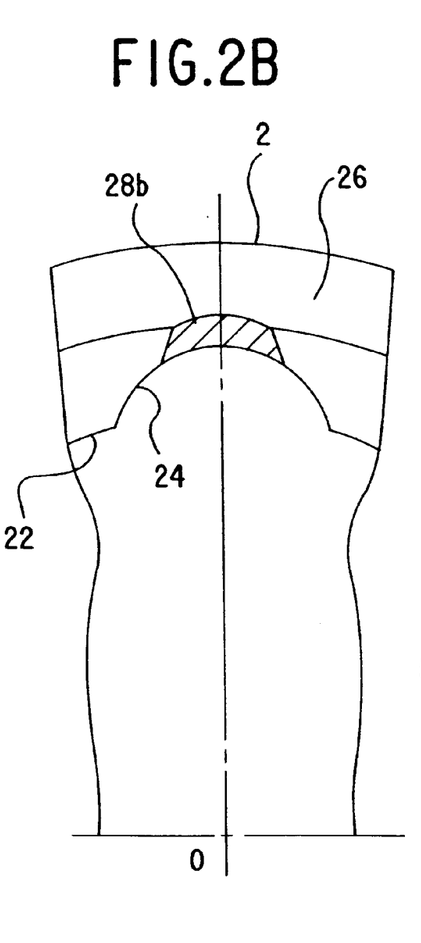
FIG. 2B is a front view similar to FIG. 1B.

FIG. 2A and FIG. 2B show an arrangement wherein the inlet track bottom for each track groove 24 is provided with a groove-shaped cut portion 28b for ball incorporation which is somewhat larger than the ball diameter. In this case, as compared with the case of removing material throughout the periphery as described above, the strength of the outer joint member 2 is further increased. As for the processing method, drilling may be used to form a cylindrical groove-shaped cut portion 28b for each track groove 24 or forging may be used to form a cylindrical groove-like cut portion 28b simultaneously with the forming of a track groove 24. While the former case of drilling requires high cost, the latter simultaneously effects the formation in the process of forging the outer joint member 2, thus being advantageous in that it incurs no additional cost and the yield of material is satisfactory.

Figure 3A:
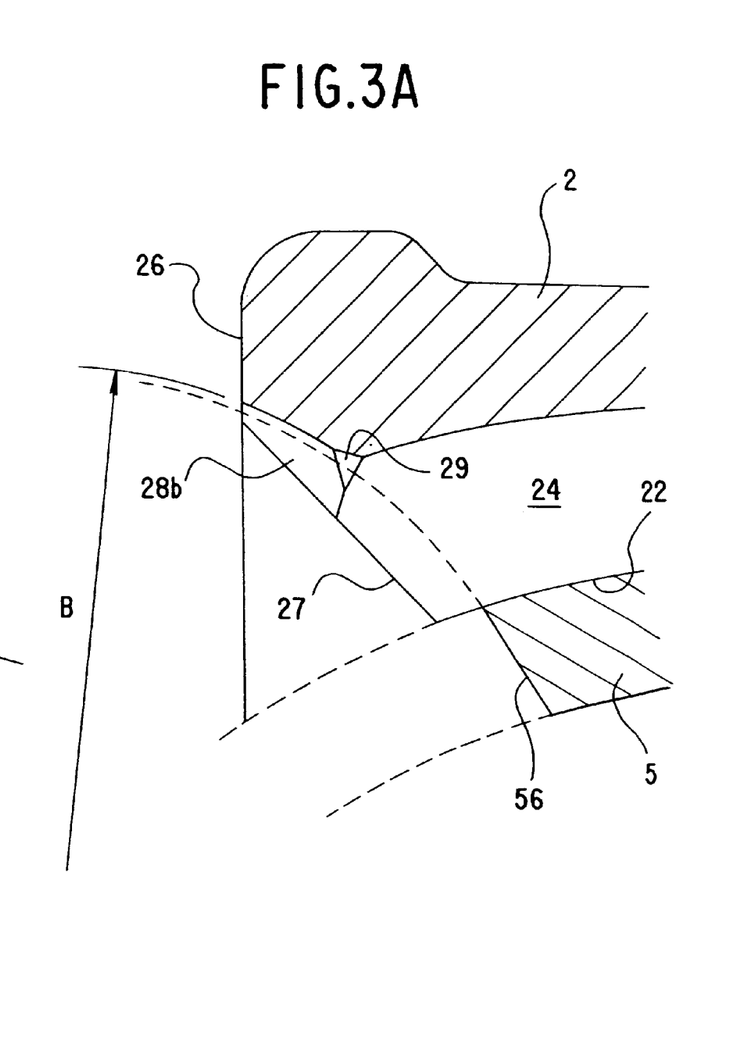
FIG. 3A is a longitudinal section similar to FIG. 1A, showing still another embodiment.
Figure 3B:
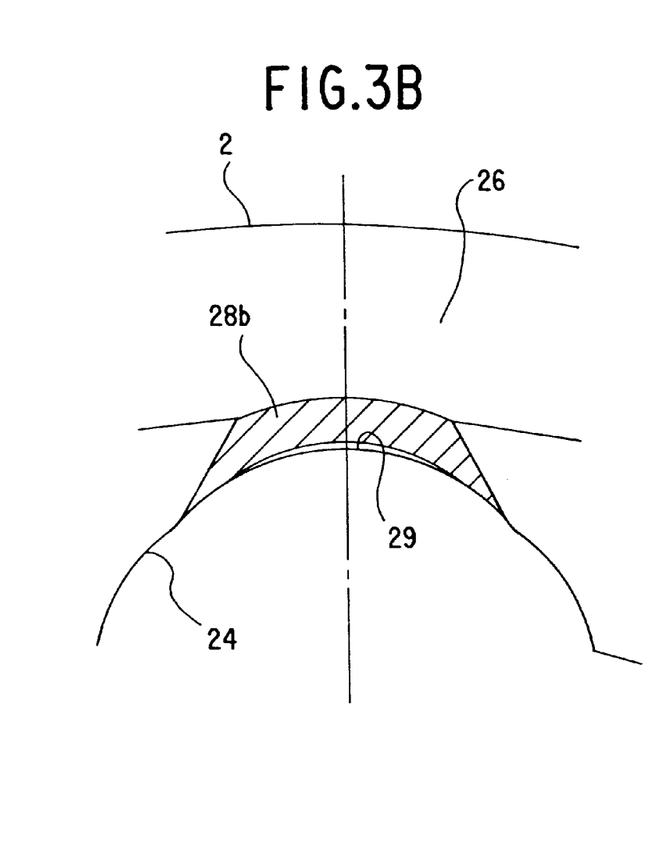
FIG. 3B is a front view similar to FIG. 1B.

A problem in forming the cut portion 28b in FIGS. 2A and 2B by forging is that the portion of a forming tool corresponding to the connecting portion between the track groove 24 and the cut portion 28b tends to have a concentrated stress acting thereon during forging operation, so that the tool life would be shortened. Accordingly, as shown in FIG. 3A and FIG. 3B, the connecting portion between the track groove 24 and the cut portion 28b is formed with a chamfer 29, and the axial shape of the cut portion is changed from the straight shape to an arcuate shape (B indicates the radius of curvature), providing a forged shape of long tool life.

Figure 4A:
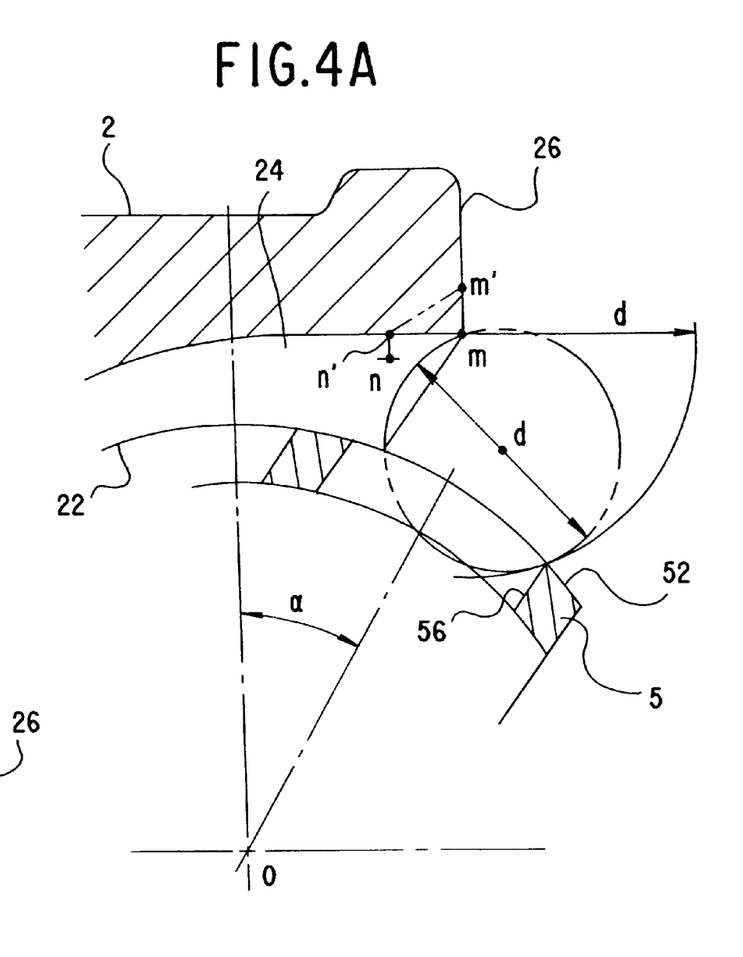
FIG. 4A is a longitudinal section showing yet another embodiment.
Figure 4B:
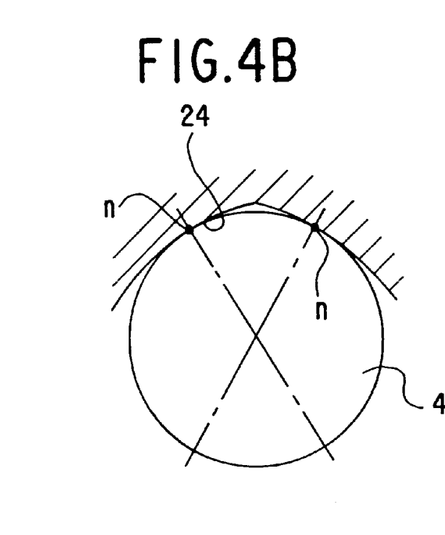
FIGS. 4B and 4C are a cross section and a perspective view of an outer joint member track groove.
Figure 4C:
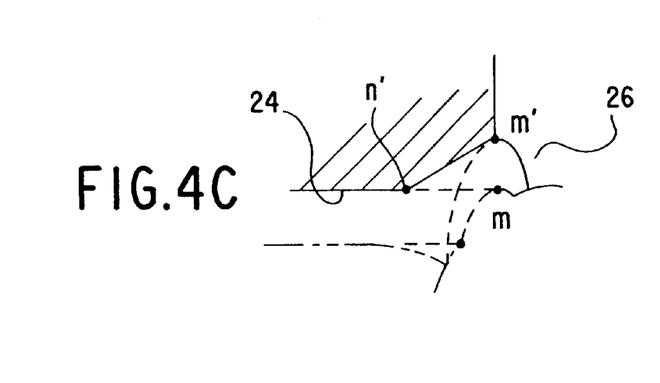

An embodiment shown in FIG. 4A through FIG. 4C is a modification of the embodiment in which the end of each track groove 24 is formed with a cut portion 28b, intended for a constant velocity universal joint of the type shown in FIG. 8. In the constant velocity universal joint shown in FIG. 8, the portions of the track grooves 24 and 34 of the outer and inner joint members 2 and 3 associated with the open end of the mouth portion 2a of the outer joint member 2 with respect to the joint center O are straight rather than undercut, thereby making it possible to take a higher operating angle than in the arrangement shown in FIG. 7.

As a measure to decrease the ball incorporating angle α, the inlet end of the track groove 24 of the outer joint member 2 which interferes with the ball 4 during incorporating of the latter is radially expanded (m→m'). Since this enables the ball 4 to move toward the innermost region of the track groove 24 without interference, it is possible to decrease the ball incorporating angle α so as to decrease the peripheral length of the pocket 56 of the cage 5 and correspondingly increase the sectional area of the column portion 58. In this case, an axial position n' which defines the starting point for expansion is set at a point which passes through a contact point n between the ball 4 and the track groove 24 which is positioned axially outermost when the constant velocity universal joint 1 takes the largest operating angle θ. And, as shown in FIG. 4A and FIG. 4C, the intersection m with the open end surface 26 of the conical surface 27 interfering with the shaft 36 at the largest operating angle θ is expanded to the point m'.

The outer joint member 2 is normally made by subjecting medium carbon steel or case hardening steel to forging, machining, heat treating (induction hardening, carburizing), grinding and assembling. The track grooves 24 of the outer joint member 2 are finished either by forging alone or by machining after forging. In the case of finishing by forging alone, they can be easily finished by forging, causing no increase in cost. Of course, it is also easy to process them by machining.

In addition, as to a method of decreasing the ball incorporating angle α, one may contemplate shifting the open end surface 26 of the outer joint member 2 backward toward the innermost region of the mouth portion 2a. However, since it approaches the contact point which is associated with the allowable operating angle, the strength of the outer joint member considerably decreases, lowering the performance of the joint; thus, this measure cannot be said to be advantageous, as already described in connection with FIG. 13A and FIG. 13B.

The assembling of the constant velocity universal joint constructed in the manner described above is the same as in the conventional arrangement previously described with reference to FIGS. 9 through 11 and therefore a description thereof is omitted.

According to the invention, the sectional area of the column portion 58 of the cage 5 can be greatly increased, making it possible to strengthen the cage 5 and radially decrease the wall thickness far more than in the conventional cage; thus, a lightweight compact-sized version of the fixed type constant velocity universal joint can be realized, and along with the compact size, material and processing costs are reduced.

Further, the strength of the outer joint member 2 of a fixed type constant velocity universal joint according to the present invention was increased. The results of tests to prove this are shown in Table 1 and FIG. 5. Table 1 shows the results of computation of stresses in the an 8-ball type BJ outer joint member according to FEM analysis. The results indicate that when the maximum principal stress is taken to be 100 for the conventional arrangement shown in FIG. 13A and FIG. 13B, it is 77 for the embodiment shown in FIG. 1A and FIG. 1B provided with an annular cut portion and 66 for the embodiment shown in FIG. 2A and FIG. 2B provided with a groove-shaped cut portion, showing that a stress reduction of 20% or above has been achieved. In addition, in either case it is in the track whose ball is closest to the open end surface that the maximum stress occurs under the condition of the operating angle θ being 40°.

TABLE 1

| Shape | Corresponding figure | Maximum principal stress ratio |
| --- | --- | --- |
| Prior art | FIGS. 13A & 13B | 100 |
| Annual cut portion | FIGS. 1A & 1B | 77 |
| Groove-shaped cut portion | FIGS. 2A & 2B | 66 |

Figure 5:
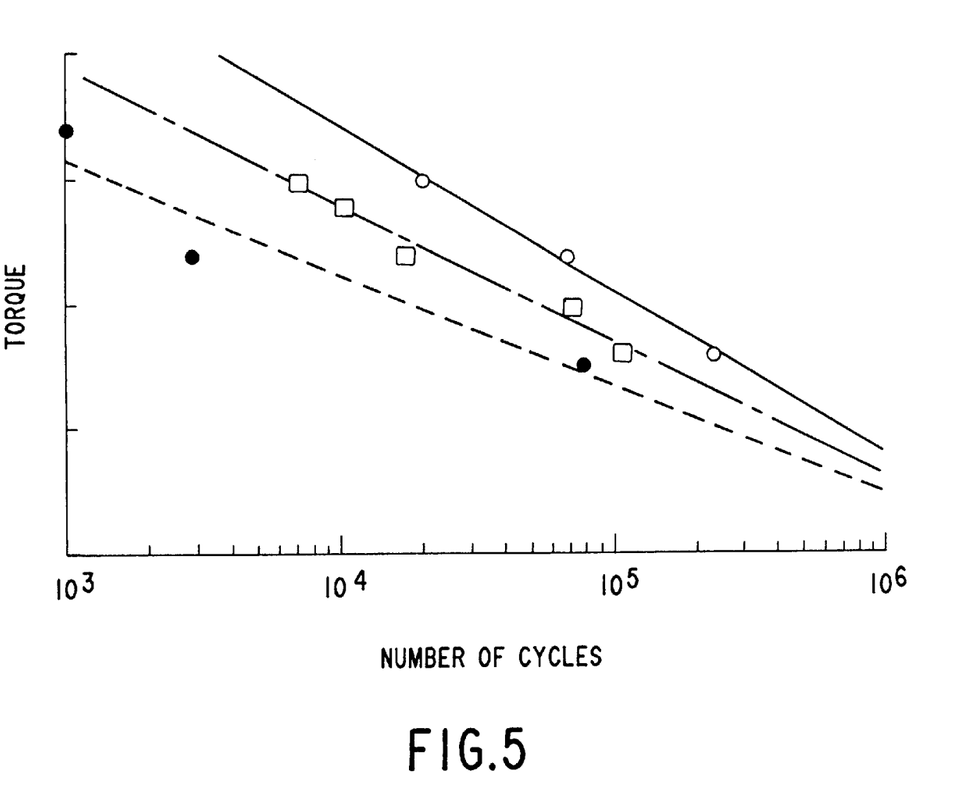
FIG. 5 is a graph showing the results of pulsating torsional fatigue tests.

FIG. 5 is a graph showing the results of pulsating torsional fatigue tests at an operating angle θ=40° of an 8-ball fixed type constant velocity universal joint. The vertical axis represents the load torque and the horizontal axis the number of times of repetition. The graph shows the results of measurements of the number of times of repetition until damage occurs for various values of load torque. The type of damage in each case is of cracking from the vicinity of the track bottom inlet of the outer joint member. In the figure, the broken line refers to the prior art of FIGS. 13A and 13B, and the chain line and solid line refer to the present invention, the chain line corresponding to the embodiment of FIGS. 1A and 1B provided with an annular cut portion, the solid line corresponding to the embodiment of FIGS. 2A and 2B provided with a groove-shaped cut portion. It is seen that the present invention remarkably improves fatigue strength as compared with the prior art.

What is claimed is:

1. A constant velocity universal joint comprising an outer joint member having a spherical inner surface formed with a plurality of track grooves, an inner joint member having a spherical outer surface formed with a plurality of track grooves, balls disposed between the track grooves of the outer and inner joint members, and a cage disposed between the spherical inner and outer surfaces of the outer and inner joint members and having pockets for receiving the balls, wherein an end of each of the track grooves which opens to an open end surface of the outer joint member is formed with a cut portion for incorporating the ball and a center of curvature of the track groove of the outer joint member and a center of curvature of the track groove of the inner joint member are offset equidistantly to opposite sides from a joint center.

2. A constant velocity universal joint as set forth in claim 1, wherein an annular cut portion is formed throughout a periphery of the outer joint member.

3. A constant velocity universal joint as set forth in claim 1, wherein a groove-shaped cut portion is formed only in a bottom of the track groove.

4. A constant velocity universal joint as set forth in claim 3, wherein said cut portion is formed only in those track grooves for which the ball incorporating angle of the cage such that the balls can be incorporated during the joint assembling process whereby interference between adjoining balls and column portions is eliminated.

5. A constant velocity universal joint as set forth in claim 3, wherein a sectional shape of said cut portion is one of circular and elliptic.

6. A constant velocity universal joint as set forth in claim 3, wherein an axial sectional shape of said cut portion is one straight and arcuate.

7. A constant velocity universal joint as set forth in claim 1, wherein said cut portion is formed by forging.

8. A constant velocity universal joint as set forth in claim 6, wherein the axial sectional shape of the track grooves in the open end surface of the outer joint member is expanded axially and toward an outer diameter from a point outside an allowable operating angle range of the joint.

9. A constant velocity universal joint as set forth in claim 5, wherein said cut portion is formed by forging.

10. A constant velocity universal joint as set forth in claim 6, wherein said cut portion is formed by forging.

* * * * *